3,440,827
AIR DRYING BY DIRECT CONTACT WITH SEPARATED LIQUID OXYGEN FRACTION

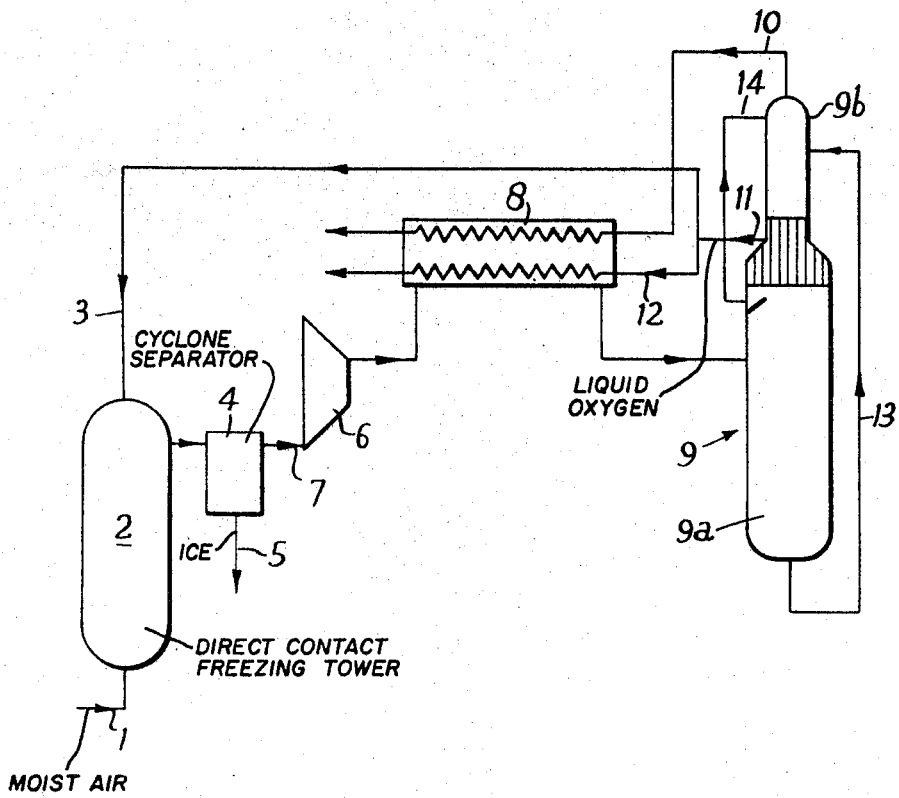

Felix Jeremy Philip Crampton and Terence Sidwell Wilkinson, Newcastle-upon-Tyne, England, assignors, by mesne assignments, to Conch International Methane Limited, Nassau, Bahamas, a Bahamian company
Filed July 7, 1965, Ser. No. 470,139
Claims priority, application Great Britain, July 7, 1964, 28,009/64
Int. Cl. F25j 3/06, 3/04
U.S. Cl. 62—13                    1 Claim

ABSTRACT OF THE DISCLOSURE

Moist feed air is directly contacted with enriched liquid oxygen to solidify the moisture present therein. Ice is separated from the dry air in a separator after which the dry air is partially liquefied and fractionated successively in high and low pressure columns. A portion of enriched liquid oxygen from the low pressure column passes into direct contact with the moist air while another portion of enriched oxygen and nitrogen fractions from the low pressure column pass in heat exchange with the dried air.

---

The invention relates to the production of dry air from moist atmospheric air.

It has been known to dry wet air by cooling the air to a temperature below the freezing point of the moisture therein, to form ice particles which are subsequently removed from the air.

The air can be cooled by contact with a cold wall, for example, the walls of a heat exchanger. The disadvantage of this system is that ice layers develop on the cold wall and soon grow to a thickness which forbids further operation. At such moment the walls have to be cleaned and during the cleaning operation the heat exchanger cannot be used.

In this respect a more satisfactory solution is provided by injecting a cold fluid directly into the air, but this method has the disadvantage that the air becomes contaminated with the cooling fluid.

It is an object of the invention to provide an efficient and simple method of producing dry air which avoids the aforementioned drawbacks.

According to the invention the dry air is produced by contacting air with a liquefied atmospheric gas, thereby freezing the moisture present in the air and evaporating the liquefied gas, and separating the frozen moisture from the air.

The liquefied atmospheric gas is preferably liquid oxygen, but liquid nitrogen or a mixture of liquid oxygen and nitrogen may also be used. The method of the invention is particularly useful in a process for the production of liquid oxygen from the air, since a portion of the produced liquid oxygen can conveniently be utilized for drying of the air supplied to the liquefaction plant.

The invention will now be described by way of example with reference to the accompanying schematic drawing which represents a flow scheme of a process for producing oxygen by separation from air. In a freezing tower 2 air is introduced through line 1. The air is of atmospheric pressure and has a temperature of, for example, 15° C. Typically the moisture content of this air would be 1% by weight. In the freezing tower 2 the air is contacted with liquid oxygen of minus 183° C., whereby the moisture in the air freezes and forms ice particles in the air. The liquid oxygen and the air may be contacted in various manners, for example, in a venturi tube or by spraying of the oxygen into the air. To assist in the formation of ice and in the subsequent removal thereof a powdery material may be circulated through the freezing tower and a regenerator positioned outside the freezing tower. In the freezing tower the ice is deposited on the surface of the powdery material, the powder acting as nuclei for the formation of the ice, whereas in the regenerator heat is supplied to melt the ice from the powder and the powder is then re-introduced into the freezing tower. The powdery material in the freezing tower may be kept in a fluidized condition by means of the air to be dried. By the vaporisation of liquid oxygen in the freezing tower the oxygen content of the air is increased, and this so-called enriched air together with the ice particles therein passes to a separator 4.

The Separator 4 may be formed by any suitable apparatus for adequately separating the ice from the air. Thus the separator 4 may be a filter having passages of a size sufficiently small to retain the finest particles of ice present in the air. For large throughputs a cyclone separator may be found more adequate. The ice is collected in the separator 4 and removed therefrom through line 5. If it is found necessary also the carbon dioxide may now be removed from the enriched air leaving the separator through line 7. The carbon dioxide may be conveniently removed by means of an absorbent, preferably by a molecular sieve. Since with respect to the original water content of the air the carbon dioxide content is very low these conventional separation means offer no particular problem and may remain in operation for an extensive period. However, since only minor quantities of carbon dioxide are involved, a special carbon dioxide separator is not an essential requirement in the process of the example, and the carbon dioxide would then deposit on the walls of a heat exchanger 8 described further below and would be removed therefrom after long periods.

The dry air from the separator 4 passes to a compressor 6. In order to reduce the power requirements of the compressor it is advantageous when the intake air of the compressor has a low temperature. For this reason more liquid oxygen may be injected into the freezing tower 2 than would be required only to freeze the moisture. An even more important reason for lowering the air temperature in the freezing tower 2 is to reduce the vapour pressure of the moisture to produce very dry air. For example, sufficient oxygen may be mixed with the air to lower the temperature of the enriched air leaving the freezing tower to minus 55° C. The compressed enriched air is further cooled and wholly or partially liquefied by passage through a heat exchanger 8, whereupon the liquefied air is fed to a conventional double column fractionator 9 having a lower high-pressure column 9a and a top low-pressure column 9b. In the drawing, only the major flow times of the fractionator 9 have been shown in order not to complicate the scheme unnecessarily.

The liquefied enriched air is introduced into the high-pressure column 9a of the fractionator, forming a bottom product of liquefied air which is still further enriched with oxygen and which is fed to the upper column 9b through line 13, and a top product formed by gaseous nitrogen which is condensed in the top of the lower column 9a and is then also passed on to the upper column 9b through line 14. In the upper column 9b the feed supplied through lines 13 and 14 is separated into gaseous nitrogen leaving the top of the column 9b through line 10, and liquid oxygen being discharged through line 11.

The stream of liquid oxygen through line 11 is divided into two streams. One stream passes through the line 3 and into the freezing tower 2 for mixing with the air freshly introduced into the freezing tower. The remaining and larger portion of the oxygen stream from line 11 passes through line 12 and through heat exchanger 8, whereby the liquid oxygen is regasified. The gaseous nitrogen from the top of the fractionator 9 also passes through the heat exchanger 8 and is thereby heated up. Thus gaseous nitrogen and gaseous oxygen both leave the heat exchanger 8 in separate streams, and may now be taken off as products or be further used in or for a subsequent process. For example, the gaseous oxygen passes to the combustion chamber of a magnetohydrodynamic power generator and the nitrogen is re-liquefied and then circulated as a cooling fluid through the magnet of this generator.

Although the invention has been explained in the example with reference to a process of separating air into nitrogen and oxygen, it is to be understood that the method may be used whenever dry air is needed, although the drying method is particularly advantageous in combination with a process in which at least at some stage liquid oxygen or liquid nitrogen is available from which a portion can be used in the process of drying the air.

We claim:
1. A method of producing dry air from moist feed air comprising, directly contacting the moist feed air with an enriched liquid oxygen stream to reduce the temperature of the moist feed air to a point at which water vapor in the feed air forms ice and separating the ice so formed from the dry air in a separator, partially liquefying the dry air, fractionating the partially liquefied dry air in the high pressure column of a two stage rectification column to form crude liquid oxygen and gaseous nitrogen which is subsequently condensed, introducing the crude liquid oxygen and condensed nitrogen into the lower pressure column to produce enriched liquid oxygen and a gaseous nitrogen fraction, passing a first portion of enriched liquid oxygen in direct contact with the said moist feed air, passing a second portion of enriched liquid oxygen and gaseous nitrogen fraction in heat exchange with the dried air before fractionation thereof.

References Cited
UNITED STATES PATENTS

| | | | |
|---|---|---|---|
| 2,503,939 | 4/1950 | De Baufre | 62—14 |
| 2,537,045 | 1/1951 | Gerbo | 62—13 |
| 2,664,719 | 1/1954 | Rice et al. | 62—14 XR |
| 2,812,645 | 11/1957 | Locklair et al. | 62—14 |
| 3,241,327 | 3/1966 | La Fleur | 62—13 |

NORMAN YUDKOFF, *Primary Examiner.*

U.S. Cl. X.R.

62—30